INVENTOR.
ROBERT B. SALTON
BY Donald P Rooney
AGENT

Dec. 17, 1968   R. B. SALTON   3,416,635
BRAKE CYLINDER DEVICE
Filed Dec. 8, 1966   2 Sheets-Sheet 2
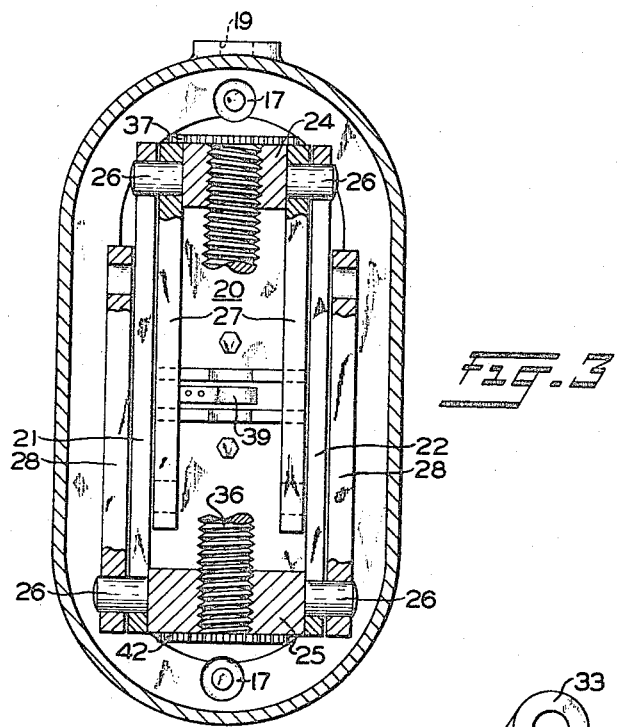
Fig. 3
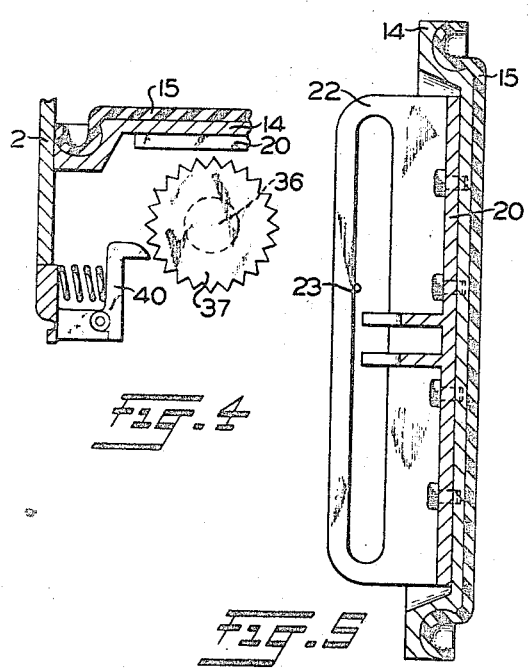
Fig. 4
Fig. 5
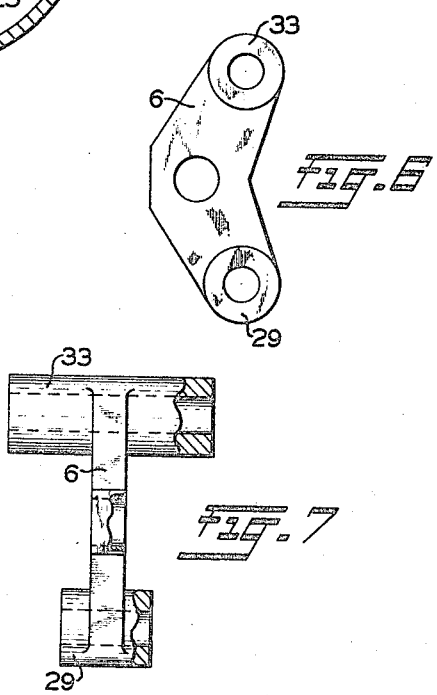
Fig. 6
Fig. 7
INVENTOR.
ROBERT B. SALTON
BY Donald P. Rooney
AGENT United States Patent Office 3,416,635
Patented Dec. 17, 1968

3,416,635
BRAKE CYLINDER DEVICE
Robert B. Salton, East McKeesport, Pa., assignor to Westinghouse Air Brake Company, Wilmerding, Pa., a corporation of Pennsylvania
Filed Dec. 8, 1966, Ser. No. 600,080
9 Claims. (Cl. 188—196)

ABSTRACT OF THE DISCLOSURE

A single shoe tread brake unit of compact design having interposed between a brake cylinder and the brake head and shoe a mechanical linkage of the lazy tong type comprising two pairs of crossed links normally locked in fixed angular relation for transmission of braking force to the brake head and shoe. A slack adjusting mechanism in the form of a pawl and ratchet responsive to increased travel of the brake cylinder piston due to brake shoe wear automatically turns a screw to adjust the angularity of the crossed links thereby taking up slack. Manual means accessible from the exterior of the unit also turns the screw to adjust the angularity of the crossed links to provide for manual adjustment of the normal clearance between the brake shoe and the tread of a wheel braked thereby.

Background of the invention

In the past, various types of single shoe tread brake units have been employed with a wide variety of mechanical linkages used between the actuating piston and brake head. While satisfactory in performance, they are relatively complex in structure with a variety and multiplicity of mechanical moving parts, and characterized by high-cost of manufacture and are relatively heavy.

It is accordingly the object of the present invention to provide a new design of a single shoe tread brake unit to be utilized, for example, in the brake system of rapid transit railway cars and trains, which is relatively simple in construction and low in cost, which also provides a light, compact unit with a long service life and which provides ease of maintenance and repair coupled with dependability of operation.

It is another object of the invention to provide a new design of single shoe tread brake unit characterized by an automatic slack adjuster that is also simple and quick to manually adjust by an external means.

According to the present invention, there is provided a single shoe tread brake unit comprising a brake cylinder device, a brake head and shoe, and a mechanical linkage in the form of a lazy-tong via which the fluid pressure force on the piston in the brake cylinder is communicated to the brake head and shoe. The lazy-tong is extended automatically as wear on the brake shoe occurs to take up slack, through a pawl and ratchet device which, on excessive return travel of the brake cylinder piston rotates an adjusting screw to which opposite ends of the lazy-tong links are connected thereby automatically extending the lazy-tong. Means are provided accessible from the exterior of the unit for manually rotating the adjusting screw to thereby take up or let out slack.

In the accompanying drawings:

FIG. 3 is a sectional view of the brake unit, taken substantially along the line 3—3 of FIG. 1.

FIG. 4 is a fragmentary view, showing details of the pawl and ratchet mechanism forming part of the slack adjusting mechanism.

FIG. 5 is a sectional view of the brake cylinder piston device, per se, showing guide seats carried thereon.

FIGS. 6 and 7 are side and front views, respectively, of a T-link forming part of the linkage connecting the brake cylinder and the brake shoe.

Figure 1:
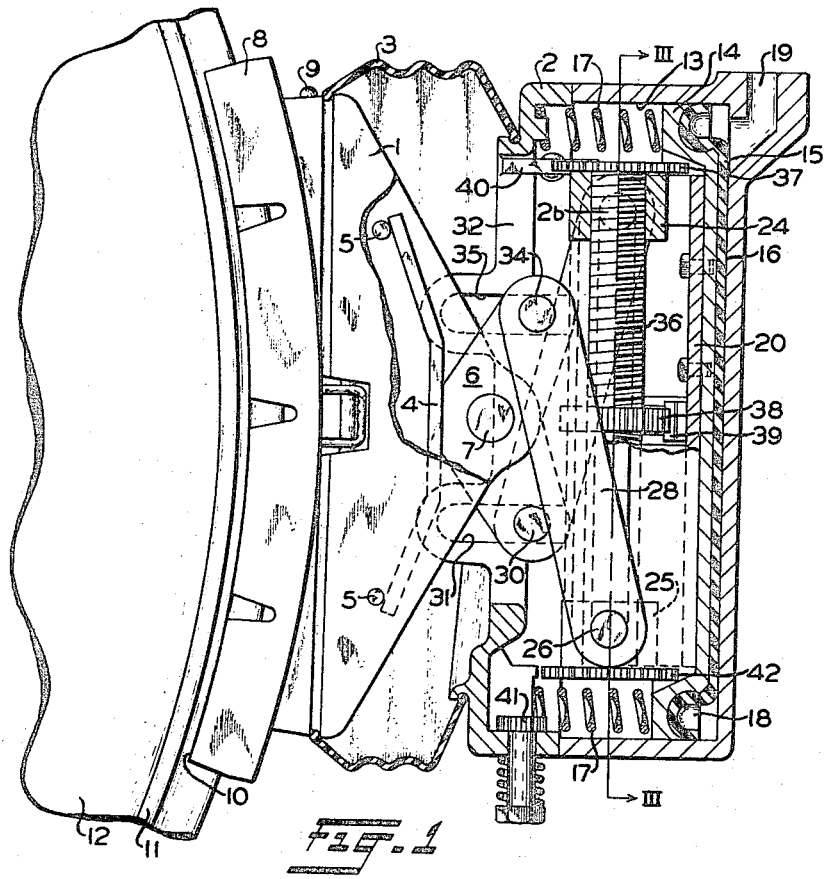
FIG. 1 is a side view of the tread brake unit, mainly in section.

As shown in the drawings, the tread brake unit is the type wherein one is provided for each wheel of a railroad car truck and secured, as by bolts and nuts, to the side frame of the truck or a member carried thereby.

The tread brake unit comprises a brake head 1 and an elliptical casing 2. Connecting the brake head 1 and casing 2 are linkage members, to be more fully described hereafter, surrounded by a dust cover 3 which is fitted at one of its ends to the casing 2 and at its other end to the brake head 1.

The brake head 1 comprises at one end a conventional clevis having a spring 4 therewith which is supported by pins 5 wherein said spring 4 abuts a T-link or bell crank 6 which is also fastened to the clevis portion of brake head 1 by a pin 7. The brake head 1 has fitted at its other end a brake shoe 8 fastened thereto by a key 9. The face 10 of the brake shoe 8 is adapted to frictionally contact the tread 11 of a wheel 12.

The casing 2 has therein a cylinder bore 13 with an elliptical piston 14 therein which has fitted thereto snap-on type packing cup 15 which is held against the pressure face 16 of casing 2 by coil springs 17 that are fitted between the non-pressure face of the piston 14 and the casing. Between the said pressure face 16 of the casing and the pressure face of the packing cup 15 is a pressure chamber 18 supplied with fluid and exhausted of fluid by way of a port 19.

Secured as by bolts to the non-pressure side of the elliptical piston 14 is a U-shaped channel guide member 20 (FIG. 3) having two parallel legs 21 and 22, spaced apart so that they are near the edge of the piston periphery. Each leg has a slot 23 therein which slots are in transverse registry with each other. Between the parallel legs are two nuts 24 and 25, each of which has two laterally extending pins 26 therein, with each pin extending into one of the respective slots 23 in the two parallel legs 21 and 22 so that the nuts 24 and 25 will be guided for vertical movement while being held against rotation. Also fitted to the pins 26 are two pairs of links 27 and 28 respectively. Links 27 are pivotally mounted at corresponding ends to the oppositely extending pins 26 of the nut 24. Links 28 are similarly pivotally mounted at corresponding ends to the oppositely extending pins 27 on each side of the nut 25.

Figure 2:
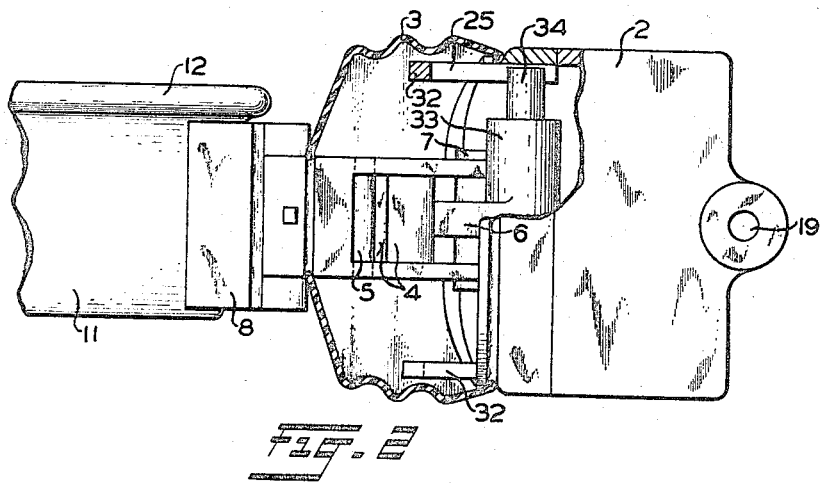
FIG. 2 is a top view of the brake unit, with portions broken away.

The aforementioned T-link 6 is pivotally connected at its respective ends to the aforementioned pairs of links 27 and 28, respectively; therefore, links 27 are fitted one on each side of a sleeve 29 and held in this respective position by pin 30 which is horizontally guided in slots 31 of guide plates 32 which are fitted immediately inside the elliptical casing 2, as can be seen in FIG. 2. The links 28 are fitted one on each side of another sleeve 33 of the T-link and held one on each side by a pin 34 which is horizontally giuded at opposite ends of a pair of slots 35 of the guide plates 32. With the ends of the links connected to the T-link and the other ends of the links connected to nuts 24 and 25 respectively, the lazy-tong type of mechanical movement is complete. As the nuts 24 and 25 and their pins 26 move together or apart, the pairs of links will move with them from their vertical toward their horizontal positions or vice versa.

The lazy-tong mechanism further comprises a slack adjuster mechanism which includes a screw 36 that has oppositely threaded end portions extending carrying thereon the nuts 24 and 25 respectively. As the screw 36 is rotated in one direction the nuts 24 and 25 are moved toward each other. Reverse rotation of the screw causes the nuts to move in the opposite direction. Screw 36 has a ratchet wheel 37 at its top end and a brake ratchet 38 midway of the ends thereof. The brake ratchet 38 is yieldingly held by a detent 39 (FIGS. 1 and 3) to resist undesired rotation of screw 36 in either direction due to the vibration of the brake unit. Ratchet wheel 37 is reciprocated with the piston bringing it into contact with a pawl 40 (FIG. 4) upon sufficient travel of the piston to the left as seen in FIG. 1. As the screw 36 and nuts 24 and 25, the elliptical piston 14 and ratchet wheel 37 are spring returned, by coil springs 17, from the brake application position the pawl 40 rotates the ratchet wheel 37, as the ratchet wheel moves back past the pawl 40.

Parallel to screw 36 at the bottom of the casing is a spring disengaged manual clutch having a gear 41 thereon which is adapted to contact the drive gear 42 fixed on the lower end of screw 36, to provide for manual rotation of screw 36 and consequent adjustment of nuts 24 and 25.

*Operation*

Let it be assumed that the brake head 1 is in the normal brake release position in which it is shown in FIG. 1 and that a brake application is desired. Upon actuation of a supply valve by the operator, compressed air flows into the pressure chamber 18 tread brake unit by way of port 19. The fluid pressure thus exerted in pressure chamber 18 on the pressure face 16 of the packing cup 15 of the elliptical piston 14 shifts it within the casing against the force of the springs 17 and through the locked lazy-tong links 27 and 28 and the T-link 6 applies brake shoe 8 to the tread 11 of the wheel 12. Brake ratchet 38 and detent 39 also reciprocate with the piston 14 and thus hold the screw 36 against rotation due to vibration. As seen in FIG. 5, screw 36 is held in its vertical position due to the pins 26 being fitted in the slots 23 and parallel legs 21 and 22 which are part of the guide member 20 and also reciprocate with piston 14. As the piston 14, along with parallel plates 21 and 22 are shifted the locked links 27 and 28 and the T-link 6 are also moved. As the T-link 6 shifts, the brake head 1 and brake shoe 8 also shift thus applying the brake shoe face 10 to the tread 11 of the wheel 12. As the brake is thus applied the lazy-tong system is shifted also and the T-link 6 is moved within the slots 31 and 35 carried by pins 30 and 34 respectively therein so that there is no tilting or twisting of the brake head.

Upon release of fluid pressure from pressure chamber 18 by way of port 19, springs 17 exert a force on the non-pressure side of piston 14, urging the piston 14 toward its release position in the casing. As this occurs parallel legs 21 and 22 and nuts 24 and 25 along with screw 36 in the lazy-tong mechanism, which includes links 27 and 28 and the T-link 6 are also returned; if there has been no appreciable attrition to the face 10 of the brake shoe 8 the ratchet wheel 37 will not have moved toward static pawl 40 enough to be engaged by the pawl upon the ratchet wheel's return movement and therefore no adjustment to the system will be made automatically. However, if the piston travel to apply the face 10 of the brake shoe 8 to the tread 11 of the wheel 12 is such that ratchet wheel 37 moves past pawl 40, because of attrition to the face 10 of brake shoe 8, a tooth of the wheel 37 will be caught by pawl 40 upon return movement, as can be seen in FIG. 4. As this occurs due to the fact that the ratchet wheel 37 is fixed to the screw 36, the screw is correspondingly turned, the holding pressure of detent 39 on the brake ratchet 38 yielding to permit turning of the screw. The nuts 24 and 25 are accordingly moved closer to each other since they are oppositely threaded and restricted from turning with the screw 36 by pins 26, which are fitted in the slots 23 of parallel legs 21 and 22. As the nuts 24 and 25 move closer together the links 27 and 28 move angularly in a scissor or lazy-tong type fashion. Because the links are fitted to the T-link 6 as they scissor they will move the T-link 6 horizontally due to the fact that it is also restricted from any other type of movement since it is being guided by the horizontal slots 31 and 35. Thus the T-link 6, brake head 1 and brake shoe 8 will be moved horizontally a slight amount away from the screw 36 which will compensate for the attrition of the brake shoe face 10 due to its contact with the tread 11 of the wheel 12 during a brake application.

If at any time the brake shoe 8 needs to be adjusted from its position with respect to the wheel 12 from outside the casing 2 this can be accomplished manually by engaging the clutch. By doing so the gear 41 will contact gear 42 and subsequent turning of the pin or rod carrying the gear 41 will cause rotation of the screw 36 to adjust the links 27 and 28 and thereby move the brake shoe 8 away from or toward the tread 11 of the wheel 12 as desired.

Although a specific embodiment of the invention has been illustrated and described, it is with full awareness that there are other modifications which are possible within the terms of the appended claims.

Having now described the invention, what I claim as new and desire to secure by Letters Patent is:

1. A brake unit for a vehicle wheel comprising, in combination:
   (a) casing means,
   (b) fluid pressure responsive means mounted for movement within said casing means,
   (c) brake means for frictionally contacting the tread of the wheel,
   (d) mechanical linkage means operatively connecting said fluid pressure responsive means and said brake means and comprising two pairs of crossed links, the angularity between which remains fixed during the transmittal of braking force from said fluid pressure responsive means to said brake means when said fluid pressure responsive means is actuated, and
   (e) means operative to change the angularity between said pairs of crossed links.

2. A brake unit as claimed in claim 1, wherein the means operative to change the angularity between said pairs of crossed links is automatically operative.

3. A brake unit as claimed in claim 1, wherein the means operative to change the angularity between said pair of crossed links comprises:
   (a) a means effective upon occurrence of movement of the fluid pressure responsive means exceeding a certain amount in causing engagement of the brake means with the tread of the wheel for effecting operation of said means operative to change the angularity between said pairs of crossed links.

4. A brake unit as claimed in claim 1, wherein the means operative to change the angularity between said pairs of crossed links comprises:
   (a) adjustable means for rigidly connecting and varying the distance between the corresponding ends of said pairs of crossed links respectively,
   (b) manually operative means, and
   (c) clutch means effective, when engaged, to enable operation of said adjustable means by said manually operative means, whereby to change the angularity between said pairs of crossed links.

5. A brake unit for a vehicle wheel comprising, in combination:
   (a) casing means,
   (b) fluid pressure responsive means mounted for movement within said casing means,
   (c) brake means having normal clearance with respect to the tread of the wheel and movable into frictional engagement therewith to effect a brake application on the wheel, (d) mechanical linkage means operatively connecting said fluid pressure responsive means and said brake means and comprising two pairs of crossed links, the angularity between which is fixed for the transmittal of braking force from said fluid pressure responsive means to said brake means,
(e) means operative to change the angularity between said pairs of crossed links, and
(f) means effective upon the occurrence of movement of said fluid pressure responsive means incident to effecting application of a braking force to the brake means exceeding a certain amount for causing operation of the last said means to so change the angularity between the crossed links as to restore the normal clearance between the brake means and the tread of the wheel.

6. A brake unit as claimed in claim 1, wherein the said means operative to change the angularity between said pairs of crossed links comprises:
(a) a rotatable screw member carried by said fluid pressure responsive means and reversely threaded at opposite ends thereof,
(b) nut means carried on opposite ends of said screw member, and
(c) means connecting the corresponding ends of one pair of crossed links to one of said nut members and the corresponding ends of the other of said pair of crossed links to the other of said nut members,
(d) said screw member and said nut members being effective to hold said crossed links in fixed angular relation and effective upon rotation of said screw member to change the angularity between said crossed links.

7. The brake unit as claimed in claim 6, wherein means carried by the said casing means is provided for guiding the respective other ends of said pairs of crossed links for movement in parallel paths in the direction of movement of the said fluid pressure responsive means.

8. A brake unit as claimed in claim 6, wherein the said means operative to change the angularity between said pairs of crossed links, further comprising:
(a) a ratchet wheel fixed on said screw member, and
(b) a pawl carried on said casing means,
(c) said pawl engaging said ratchet wheel upon movement of the fluid pressure responsive means exceeding a certain amount incidental to applying a braking force to the brake means for effecting rotation of said screw member in a direction to change the angularity between the said pairs of crossed links when the fluid pressure force on the fluid pressure responsive means is relieved.

9. A brake unit as claimed in claim 8, further characterized by means yieldingly resisting rotation of said screw member.

References Cited
UNITED STATES PATENTS

| | | | |
|---|---|---|---|
| 418,573 | 12/1889 | Lawrence | 188—153 |
| 2,109,114 | 2/1938 | Kerr. | |
| 2,118,236 | 5/1938 | Schwentler | 188—153 |
| 2,376,686 | 5/1945 | Goepfrich | 188—152 |

DUANE A. REGER, *Primary Examiner.*

U.S. Cl. X.R.

92—140; 74—521; 188—153, 74